United States Patent [19]

Haite

[11] Patent Number: 4,925,014
[45] Date of Patent: May 15, 1990

[54] TRANSPORT ROLLER FOR GLASS COOLING PASSAGES

[75] Inventor: Michael Haite, Erkrath, Fed. Rep. of Germany

[73] Assignee: Pose-Marre Edelstahlwerk GmbH, Erkrath, Fed. Rep. of Germany

[21] Appl. No.: 156,292

[22] Filed: Feb. 16, 1988

[30] Foreign Application Priority Data

Feb. 14, 1987 [DE] Fed. Rep. of Germany ....... 3704744

[51] Int. Cl.$^5$ ............................................. B65G 13/02
[52] U.S. Cl. ..................................... 198/780; 193/37; 29/110; 65/253; 165/90; 432/246
[58] Field of Search ......................... 198/780; 193/37; 432/246; 165/89, 89 H, 90; 65/245, 253, 374.14; 29/110, 129.5, 130, 132

[56] References Cited

U.S. PATENT DOCUMENTS

| 2,300,528 | 11/1942 | Sherts | 65/253 |
| 3,115,335 | 12/1963 | Ornitz et al. | 432/246 |
| 3,384,469 | 5/1968 | McCown et al. | 65/253 |
| 3,751,195 | 8/1973 | Snow | 432/246 |
| 4,071,081 | 1/1978 | Chielens et al. | 165/90 |
| 4,299,018 | 11/1981 | Bickerstaff et al. | 65/253 |
| 4,459,148 | 7/1984 | Diederen et al. | 65/253 |

Primary Examiner—Joseph E. Valenza
Attorney, Agent, or Firm—Toren, McGeady & Associates

[57] ABSTRACT

In order to avoid deformation of a transport roller due to temperature differences in glass cooling passages, the cylindrical or tubular center part of the roller, arranged between two trunnions, is axially displaceable relative to the trunnions.

8 Claims, 2 Drawing Sheets

TRANSPORT ROLLER FOR GLASS COOLING PASSAGES

TECHNICAL FIELD OF THE INVENTION

The invention concerns a transport roller for glass cooling passages comprising two trunnions and a cylindrical center part arranged between them.

BACKGROUND OF THE INVENTION AND PRIOR ART

Transport rollers of this kind are used in glass cooling passages for sheet glass production.

In the so-called float process, the sheet of glass floating on the tin bath is lifted off by means of a roll. Transport or drawing rollers lead the glass ribbon through a cooling passage for further processing. In order to maintain a fixed width and thickness of the ribbon a fixed temperature profile is necessary when cooling the glass ribbon in the cooling passage. This also applies to other processes.

In the cooling passage zones in which a relatively uniform temperature prevails, rollers of metal can be used of which the alloy composition is suitable for the operating requirements regarding oxidation and corrosion. Ferritic, ferritic-austenitic or austenitic steels may be used; the tubular center part of the roller is generally produced by centrifugal casting. In order to guarantee an optimal quality of glass the surface of the roller has a high polish, e.g. a peak-to-valley height of Ra = 0.8 $\mu$m. Accordingly, pores or slag inclusions are not permissible.

In the regions of the glass cooling passages in which the ambient temperature is non-uniform, for example where it is necessary to subject the glass ribbon to a strong blast of cooling air, rollers whose center part is rigidly fixed to the trunnions and whose surface is cylindrically smooth have not been found satisfactory. Temperature differences in the center part of the roller lead to curved deformations which increase with each rotation of the roller.

For this reason, rollers with their center parts coated with asbestos are used in the regions of the cooling passages having an uneven distribution of temperature.

Another possible way of avoiding deformation of the rollers consists in making the center part from disks arranged at a distance from one another. While this gives a better stability of the shape of the roller even with a very uneven temperature distribution, disk rollers have the disadvantage that the surface pressure is increased owing to the reduction in size of the contact surfaces, and as a result damage to the glass ribbon can occur which inevitably increases with the thickness of the glass.

OBJECT OF THE INVENTION

The object of the invention is therefore to provide a transport roller for glass cooling passages which avoids or at least greatly reduces deformation caused by uneven ambient temperatures.

BRIEF DESCRIPTION OF THE INVENTION

This object is achieved according to the invention with a roller of the kind mentioned in the introduction if, at least in the region of one of the trunnions, the tubular center part is axially displaceable relative to the trunnion. The trunnion and the so to speak floating center part are thus no longer rigidly attached to one another but in such a way that the center part, which is attached in all cases on one side to a trunnion, is free to expand or contract. Thus when there are temperature differences no differential expansions can occur in the center part which affect the contour of the center part and the length of the roller and the roller bearing.

The center part can be connected to the trunnions by means of support rings or star-shaped supports arranged in the region of its ends or end faces. Preferably at least one of the supports is connected to the center part so as to be axially displaceable but not rotatable.

The trunnions can be connected to one another by a continuous supporting shaft, as is known for rollers coated with asbestos. In this way the rollers can still be used when the asbestos coating is replaced by a tubular center part.

The tubular center part can have a larger internal diameter than the supporting shaft so that there is an annular space between the center part and the continuous supporting shaft which can either be empty or filled with a heat-resistant insulating material. The continuous shaft is thermally insulated from the center part by this annular space so that the shaft does not distort even with changing temperatures.

In another embodiment the trunnions are not connected to one another by a continuous supporting shaft but only by the tubular center part. As this center part, owing to its axial displaceability on at least one trunnion, does not contribute to the axial guidance of the trunnions, these are preferably doubly mounted independently of one another. In this case the diameter of the center part can be the same as or smaller than the diameter of the trunnions.

A further measure to avoid uneven temperatures in the center part of the roller consists in matting the surface of the center part or providing it with an oxide film in order to reduce thermal radiation.

BRIEF DESCRIPTION OF THE DRAWINGS

The invention will now be described in more detail with reference to several exemplary embodiments shown in the drawing, in which.

DETAILED DESCRIPTION OF PREFERRED EMBODIMENTS OF THE INVENTION.

Figure 1:
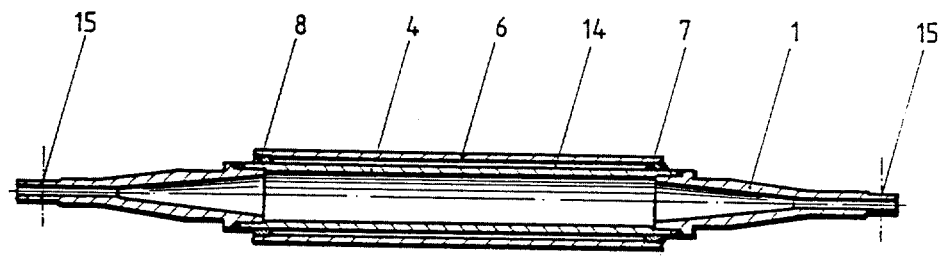
FIG. 1 shows a longitudinal section through a roller produced according to the invention using a roller originally coated with asbestos.

The roller according to FIG. 1 comprises trunnions 1, which are connected to one another by means of a tube 4 as a continuous shaft. A tubular center part 6 with a larger diameter is held in the region of the tube 4 concentric to the trunnions 1 and the tube 4 by means of support rings 7, 8. The support ring 7 is welded to the tube 4 as well as to the center part, whilst the support ring 8 is only welded to the center part 6 and is axially displaceable on the tube 4.

The trunnions 1 and the tube 4 connecting them correspond to a conventional asbestos coated roller, which however has been altered according to the invention by means of the support rings 7, 8 and the tubular center part. Located between the tube 4 and the center part 6 is an annular space 14 which can be empty or alternatively can be filled with a heat-resistant insulating layer. Owing to the freedom of displacement in the region of the support ring 8 and the insulating layer in the annular space 14 uneven heating of the center part 6 is kept away from the trunnions 1 and the tube 4 so that this part of the roller is not subjected to any deformation caused by the temperature. Expansion or deformation of the center part 6 caused by the temperature is not transferred to the trunnions 1 and the tube 4 because of the axial displaceability of the support ring 8, so that the roller as a whole can withstand changing temperatures without disadvantages.

Figure 2:
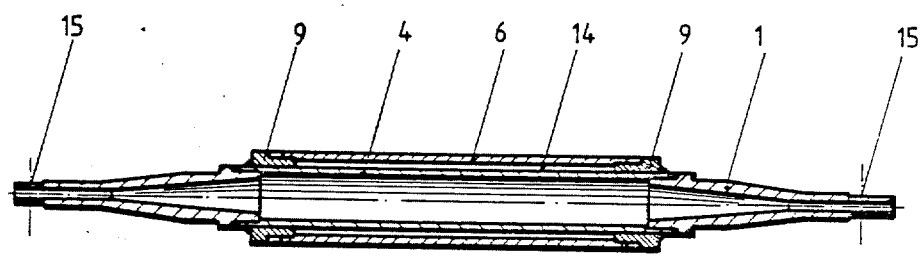
FIG. 2 shows a longitudinal section through a roller differing from the roller according to FIG. 1 in having a different mounting for the center part.

The exemplary embodiment according to FIG. 2 differs from the exemplary embodiment in FIG. 1 in that both support rings 9 are welded to the supporting shaft of the trunnions 1 and to the tube 4. Both ends of the center part 6 are axially displaceable on the support rings 9, but are secured against rotating by means of a slit 10 in the center part 6 and a key 11 on the support ring 9.

Figure 3:
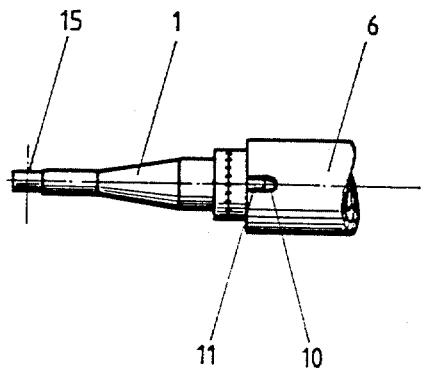
FIG. 3 shows a partial view of the roller according to FIG. 2.

The rollers according to FIGS. 1 to 3 are mounted at each end in a bearing 15 indicated by a dash-dot-line.

Figure 4:
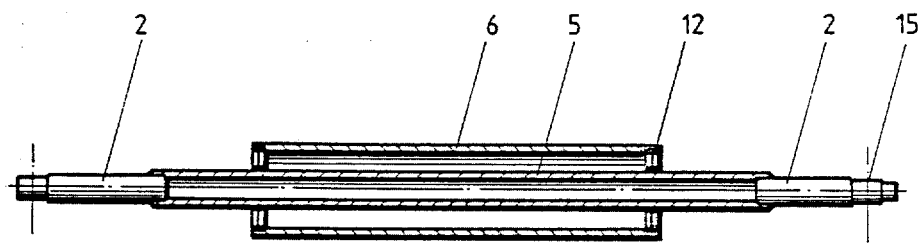
FIG. 4 shows a further roller with trunnions connected to one another by a continuous shaft.
Figure 5:
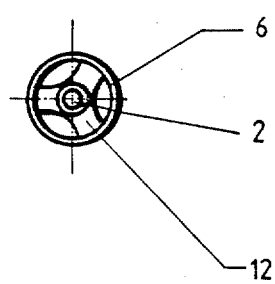
FIG. 5 shows a front view of the roller according to FIG. 4

In the exemplary embodiment according to FIGS. 4 and 5 the trunnions 2 are generally cylindrical and connected to one another by means of a continuous tubular shaft 5 with a relatively small diameter. The tubular center part 6 is mounted on the continuous shaft 5 by means of star-shaped supports 12 arranged at its ends. As a result it is possible to ventilate the annular space between the center part 6 and the continuous shaft, which results in better equalization of the temperature. One of the star-shaped supports 12 is welded to the continuous shaft 5 as well as to the center part 6, whilst the other star-shaped support 12 is either welded only to the center part 6 or only to the continuous shaft 5, whereby the axial displaceability of the center part 6 relative to the continuous shaft 5 is guaranteed. In this case the bearing 15 also forms a simple bearing for the roller.

Figure 6:
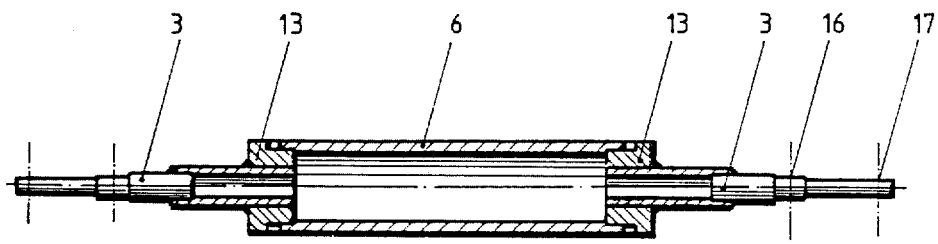
FIG. 6 shows a roller without a continuous shaft.

In the exemplary embodiment according to FIG. 6 the trunnions 3 are only connected to one another by the center part 6. For this reason each trunnion 3 is doubly mounted, in a bearing 16 and a bearing 17. The center part 6 is supported by support rings 13 on the trunnions 2, the center part 6 being axially displaceable relative to both stub shafts of the bearings similarly to the exemplary embodiment according to FIGS. 2 and 3, but being secured against rotation by a groove and key connection or by clover-leaf-type connections.

In order to reduce the thermal radiation the center part 6 which comes into contact with the glass ribbon can be matted or provided with an oxide layer.

What is claimed is:

1. A transport roller for glass cooling passages, comprising:
   two trunnions;
   a tube having one of the trunnions connected at each end thereof;
   an outer cylinder arranged around the tube and between the trunnions so as to be axially displaceable at least in the region of one of the trunnions; and
   support members arranged in the region of the ends of the outer cylinder so as to connect the outer cylinder to the trunnions so that the support members are the sole support of the outer cylinder on the tube, the support members supporting the outer cylinder so that a space exists radially between the outer cylinder and the tube, at least one of the support members being provided so as to prevent relative rotation between the outer cylinder and the tube.

2. A roller according to claim 1, wherein support members are star-shaped.

3. A roller according to claim 1, wherein at least one of said support members is connected to the outer cylinder so as to be axially displaceable but not rotatable.

4. A roller according to claim 1, wherein an insulating layer is arranged in the space between the outer cylinder and the tube.

5. A roller according to claim 4, wherein said space is filled with air.

6. A roller according to claim 1, wherein the space between the tube and the outer cylinder is at least partially filled with a heat resistant insulating material.

7. A roller according to claim 1, wherein the outer cylinder has a matt surface or is provided with an oxide film effective to reduce thermal radiation.

8. A roller according to claim 1, wherein the support members are formed as rings.

* * * * *